United States Patent [19]
Mitani et al.

[11] 3,937,689
[45] Feb. 10, 1976

[54] RADICAL INITIATOR-CURABLE DIALLYL ESTER COMPOSITIONS AND CURED RESINS OBTAINED THEREFROM

[75] Inventors: Yuji Mitani; Yuzo Aito; Masahiro Yamaguchi, all of Hino; Kiyoshi Nawata, Hachioji, all of Japan

[73] Assignee: Teijin Ltd., Osaka, Japan

[22] Filed: July 1, 1974

[21] Appl. No.: 484,871

[52] U.S. Cl. ... 260/78.5 UA; 260/78.4 UA; 260/875
[51] Int. Cl.² .............. C08F 218/16; C08F 218/18; C08F 222/26
[58] Field of Search ............ 260/78.4 UA, 78.5 UA

[56] References Cited
UNITED STATES PATENTS

| | | | |
|---|---|---|---|
| 2,671,060 | 3/1954 | Morris et al. | 260/17 |
| 3,113,123 | 12/1963 | Heiberger et al. | 260/78.5 UA |
| 3,424,729 | 1/1969 | Lanaka et al. | 260/78.4 UA |
| 3,455,888 | 7/1969 | Thomas | 260/78.5 UA |

Primary Examiner—John Kight, III
Attorney, Agent, or Firm—Sherman & Shalloway

[57] ABSTRACT

A radical initiator-curable diallyl ester composition consisting essentially of 80 – 100% by weight of the following components (A) and (B):

A. a prepolymer wherein 1. 70 – 100 mole % of its structural units are derived from a diallyl ester selected from the group consisting of
   a. a diallyl ester of benzenedicarboxylic acid having the formula (I)

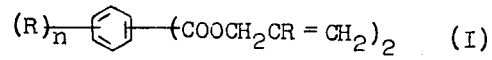

b. a diallyl ester of cyclohexanedicarboxylic acid having the formula (II)

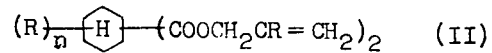

c. a mixture of the above (a) and (b); and
2. 30 – 0 mole % of its structural units are derived from other compounds selected from monomeric diallyl esters of dibasic acids and other monomers and polymers, said compound being copolymerizable with said (a) – (c) under the conditions of forming said prepolymer; and B. a monomer of a diallyl ester of naphthalenedicarboxylic acid having the formula (III)

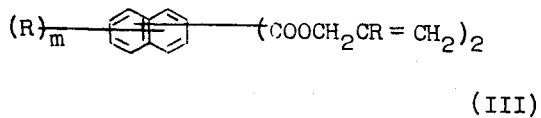

3 Claims, No Drawings

RADICAL INITIATOR-CURABLE DIALLYL ESTER COMPOSITIONS AND CURED RESINS OBTAINED THEREFROM

This invention relates to a radical initiator-curable composition composed of a major amount of a prepolymer of a diallyl ester of benzenedicarboxylic acid and-/or cyclohexanedicarboxylic acid and a minor amount of a diallyl ester of naphthalenedicarboxylic acid, which composition has a markedly improved stability of its flow during its molding as well as molding suitability as evidenced by an improvement in the quality of the molded product. This invention also relates to the cured resin obtained therefrom.

The radical initiator-curable diallyl ester compositions obtained by incorporating in the prepolymer of a diallyl ester of benzenedicarboxylic acid, such as diallyl orthophthalate or diallyl isophthalate, a small amount of a monomer of these diallyl esters have been known hitherto. The cured resins obtained by curing these compositions are being widely used in view of their possession of excellent dimensional stability, thermal resistance and resistance to chemicals. However, in the case of these conventional diallyl ester compositions, their flow during molding has not been improved to such an extent as to be fully satisfactory, with the consequence that it is necessary to carry out the molding under a considerably high pressure. Again, since this flow is not stable, there is a tendency to the flow deviating from the range of flow considered desirable. Hence, difficulty is experienced in obtaining shaped articles with good reproducibility. Further, such a defect as undesirable hardening of the composition during its storage or in the molding machine frequently occurred. For instance, in the case of the diallyl isophthalate prepolymer or the molding material thereof, when 6 months elapse at room temperature in the case of the former and more than three months elapse in the case of the latter a marked change takes place in the properties of these materials. As a means of improving the flow of such a diallyl ester resin composition a method of using a large amount of a monomer of either diallyl orthophthalate or diallyl isophthalate has been practiced in the past. However, in this method the resinous composition becomes too soft to result in a decline in the pulverizability of the composition. In consequence, difficulty is experienced in processing the composition into such forms as chips, powder, flakes or granules. Again, there are such shortcomings as the moldability of the composition declining to result in the charging of the molding machine becoming difficult in carrying out the injection molding operation, or the dimensional stability declining to cause a marked increase in the molding shrinkage. Further, the thermal resistance of the cured resins obtained from these resinous compositions is not of such excellence as to be fully satisfactory. For instance, the deflection temperature under load of the diallyl orthophthalate cured resin is 155°C., and the reduction in weight of the resin when exposed for 2 hours to 260°C. air is as high as 10%.

In consequence of our researches with a view to obtaining a radical initiator-curable composition which, before molding, excels in pulverizability and storage stability, as well as excels in its flow during molding, stability of its fluidity in the molding machine and dimensional stability and which, after molding, provides with excellent quality reproducibility a diallyl ester cured resin excelling in thermal resistance, resistance to attack by chemicals and electrical properties, we found that the foregoing object could be effectively attained by a composition consisting essentially of 80 – 100% by weight, and preferably 90 – 100% by weight, of the following components (A) and (B):

A. a prepolymer wherein
1. 70 – 100 mole % of its structural units are derived from a diallyl ester selected from the group consisting of
   a. a diallyl ester of benzenedicarbocylic acid having the formula (I).

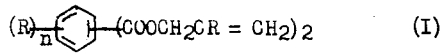

$(R)_nH$—(COOCH$_2$CR = CH$_2$)$_2$      (I)

wherein the R's, which may be the same or different, are hydrogen or methyl, and $n$ is an interger from 1 to 2,
   b. a diallyl ester of cyclohexanedicarboxylic acid having the formula (II)
   $(R)_nH$—(COOCH$_2$CR=CH$_2$)$_2$      (II)
   wherein the R's and $n$ are as defined above, and
   c. a mixture of the above (a) and (b); and
2. 30 – 0 mole % of its structural units are derived from a member selected from monomeric diallyl esters of dibasic acids and other monomers and polymers, which are copolymerizable with said (a) – (c) under the conditions of forming said prepolymer; and B. a monomer of a diallyl ester of naphthalienedicarboxylic acid having the formula (III)

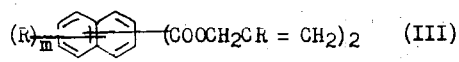

$(R)_m$—(COOCH$_2$CR = CH$_2$)$_2$      (III)

wherein the R's are as above defined and $m$ is an integer from 1 to 4, which groups —COOCH$_2$CR=CH$_2$ are attached in either the 2,7-, 1,5- or 2,6-position; said monomer (B) being contained in an amount of 5 – 50%, and preferably 5–20%, by weight based on said prepolymer (A), and the remaining 20 - 0%, and preferably 10 – 0%, by weight of said composition being other monomers or polymers copolymerizable with a member selected from the group consisting of said prepolymer (A) and said monomer (B) at the conditions under which said composition is cured.

It is therefore an object of this invention to provide a radical initiator-curable diallyl ester composition having the aforementioned improved properties and also a cured resin thereof in the form of a shaped article.

Other objects and advantages of the present invention will become apparent from the following description.

As specific examples of the diallyl esters of benzenedicarboxylic acid of the foregoing formula (I), included are diallyl orthophthalate, diallyl isophthalate, diallyl terephthalate, diallyl methylisophthalate, diallyl methylterephthalate, diallyl methylorthophthalate, dimethallyl orthophthalate, dimethallyl isophthalate and dimethallyl terephthalate. On the other hand, as specific examples of the diallyl esters of cyclohexanedicarboxylic acid of the foregoing formula (II), mention can be made of diallyl (trans and cis-hexahydrophthalate), diallyl (trans and dis-hexahydroisophthalate), diallyl (trans and cis-hexahydroterephthalate), diallyl (trans and cis-hexahydromethylisophthalate) and diallyl (trans and cis-hexahydromethylterephthalate). The homo- or coprepolymers derived from one or more classes of these diallyl esters of dicarboxylic acids can be utilized. Of these, especially to be preferred is the utilization of either the homo- or coprepolymers derived from at least one of the dicarboxylic acid diallyl esters selected from the group consisting of diallyl isophthalate, diallyl methylisophthalate, diallyl (cis-hexahydroterephthalate) and diallyl (cis-hexahydroisophthalate). Not only can these homo- and coprepolymers be used simply, but also a plurality thereof can be used conjointly.

The aforesaid prepolymer (A) used in the present invention is preferably one which is substantially linear and of a number average molecular weight of about 1000 - about 50,000. Those having a number average molecular weight of about 2000 - about 20,000 are most preferably used. Further, this prepolymer (A) is one whose iodine value is preferably 30 - 100, and more preferably 40-90.

The method of preparing the prepolymer (A) is well known. For instance, it can be readily prepared by a procedure consisting of heating the aforementioned dicarboxylic acid diallyl esters as such or after dilution with a solvent, in the presence or absence of a free radical initiator, terminating the reaction at a point usually where about 5 - 50 weight % of the aforesaid diallyl ester has been consumed, and then separating the unreacted component or residual solvent from the reaction mixture. While the reaction temperature can be varied within a broad range depending upon such factors as the class of the free radical initiator used or the pressence or absence of a solvent and its class and amount used, usually a temperature ranging between 75° and 200°C. is preferably used.

Especially in the case where a peroxide is used as the free radical initiator, it is convenient to use an organic solvent and operate at a temperature of 80° - 140°C. under total reflux conditions by adjusting the refluxing temperature. While this reaction can be carried out at pressures extending over a broad range from reduced pressure to superatmospheric pressure, usually the reaction is conveniently carried out at atmospheric pressure.

As the solvent that is preferably used in the foregoing reaction, included are the lower aliphatic alcohols of not more than 5 carbon atoms such, for example, as n-propanol and sec-butanol; the aromatic hydrocarbons such, for example, as benzene, toluene, xylene, ethylbenzene and isopropylbenzene; and the lower aliphatic ketones such, for example, as acetone, methyl ethyl ketone and methyl isobutyl ketone. The use of a solvent is to be preferred, since it serves to facilitate the adjustment of the temperature of the reaction system as well as to maintain the reaction system in a uniform state.

On the other hand, usable as the radical initiators are, for example, the organic peroxides such as benzoyl peroxide, t-butylhydroperoxide and t-butylperbenzoate; the azo compounds such as 2,2'-azobisisobutyronitrile; and other like substances. The use of these radical initiators in an amount of usually 0.05 - 10% by weight of the starting materials is sufficient.

The prepolymer (A) used in this invention can contain, in addition to at least one class of the structural units selected from the diallyl esters of the foregoing formulas (I) and (II), a minor amount, usually not more than 30 mole %, and preferably not more than 15 mole %, of structural units derived from diallyl esters of other dibasic acids and a monomer or polymer having an unsaturated double bond and copolymerizable with the diallyl esters of the foregoing formulas (I) and (II).

The foregoing propolymer (A) can be obtained by carrying out the reaction by substituting for a minor portion of the dicarboxylic acid diallyl esters either, a diallyl ester of other dibasic acids or a monomer or polymer having an unsaturated double bond and copolymerizable with the diallyl esters of the foregoing formulas (I) and (II) in preparing the prepolymer of dicarboxylic acid diallyl ester.

As the foregoing copolymerizable monomer or polymer having an unsaturated double bond, mention can be made of such, for example, as the vinyl monomers as acrylonitrile, styrene and methyl methacrylate; the diallyl and dimethallyl esters of dibasic acids such as naphthalenedicarboxylic acid, diphenyldicarboxylic acid, diphenylmethanedicarboxylic acid, diphenylsulfonedicarboxylic acid, maleic acid, fumaric acid, adipic acid, muconic acid, dimethylmuconic acid, and hexachloroendomethylenetetrahydrophthalic acid; the monoallyl esters of monobasic acids such as allyl benzoate, allyl methacrylate and allyl naphthoate; the polyallyl esters such as trimellitic acid triallyl ester, triallyl cyanurate, triallyl isocyanurate, triallyl phosphate and naphthalenetetracarboxylic acid tetraallyl ester; 1,2-polybutadiene and 1,4-polybutadiene. The resulting prepolymer (A) containing a minor amount of other structural units, as indicated above, can be used in the invention method in like manner as in the case of the aforementioned prepolymer.

As the diallyl ester of naphthalenedicarboxylic acid of the foregoing formula (III), which is used in this invention in an amount of 5 - 50%, and preferably 5 - 20%, by weight of the prepolymer (A), included are, for example, the diallyl and dimethallyl esters of the 1,5-, 2,6- or 2,7naphthalenedicarboxylic acid. Of these, most preferably used are the diallyl esters of 2,7- and 2,6-naphthalenedicarboxylic acids. These monomers of formula (III) can be used either singly or in combinations of two or more thereof.

The radical initiator-curable diallyl ester composition of this invention consists essentially of a prepolymer (A) and a monomer (B), such as above described. And, as previously indicated, the monomer (B) is used in an amount of 5 - 50%, and preferably 5 - 20%, by weight of the prepolymer (A). When the proportion of the monomer (B) in the composition is less than the lower limit indicated above, the flow, thermal resistance, and the storage stability or the stability of flow in the molding machine show a decline. On the other hand, when the proportion of the monomer (B) in the composition exceeds the upper limit indicated above, the curing reaction becomes slow and the time required for the molding becomes excessively long, with the consequence that satisfactory shaped articles cannot be obtained by operating under the usual molding conditions.

Another important feature of the present invention resides in the fact that, as previously indicated, while retaining the property that the daillyl composition is readily pulverizable its flow during molding has been improved greatly. That is to say, it has been the practice in the past to increase the monomer such as diallyl orthophthalate or diallyl isophthalate beyond the amount considered suitable for improving the flow of the curable diallyl composition. However, since in this case these monomers are liquid, tackiness of the composition results to make its comminution impossible, or troubles such as form retention difficulties occur due to the blocking phenomenon during the composition's storage. On the other hand, when the invention monomer (B) is used, these troubles at the time of comminution or storage do not happen at all, and the improvement in the flow is readily attained.

Further, the invention composition can also contain minor amounts of other monomers or polymers (C) that are copolymerizable with said prepolymer and/or monomer at the conditions under which said composition is cured.

As specific examples of these monomers and polymers (C), mention can be made of the vinyl monomers such as acrylonitrile, styrene and methacrylate; the diallyl and dimethallyl esters of such dibasic acids as orthophthalaic acid, isophthalic acid, terephthalic acid, methylorthophthalic acid, methylisophthalic acid, methylterephthalic acid, trans- and cis-hexahydroorthophthalic acids, trans- and cis-hexahydroisophthalic acids, and trans- and cis-hexahydroterephthalic acids; the diallyl and dimethallyl esters of such dibasic acids as diphenylmethanedicarboxylic acid, diphenyldicarboxylic acid, diphenylsulfonedicarboxylic acid, hexachloro-endomethylenetetrahydrophthalic acid, maleic acid, fumaric acid, sebacic acid and adipic acid; the prepolymers of these dibasic acid diallyl esters and/or dimethallyl esters; the prepolymers of the naphthalenedicarboxylic acid diallyl esters; the monoallyl esters of monobasic acids, such as allyl benzoate, allyl methacrylate and allyl naphthoate; the polyallyl esters such as trimellitic acid triallyl ester, triallyl cyanurate, triallyl disocyamurate, triallyl phosphate and naphthalenetetracarboxylic acid tetrallyl ester; and 1,2- and 1,4-polybutadiene and the unsaturated polyesters.

These monomers and/or polymers (C) can be used in an amount of 20 – 0% by weight, preferably 10 – 0% by weight, of the total composition. Of these monomers, in the case of especially diallyl orthophthalate, diallyl isophthalate and diallyl terephthalate, which are monomers that are liquid at room temperature, it is best that these be used in an amount of not more than 10% by weight, since adverse effects will be had on the resulting resin when used in excess.

The invention composition is curable with the radical initiators. While the amount used of the radical initiator and the curing temperature are suitably varied in accordance with the makeup of the composition and the class of initiator used, the amount usually used is preferably about 0.5 – 5% by weight based on the total of the aforesaid components (A) and (B) and, as the case may be, the component (C). And a curing temperature usually in the range of about 100 – 200°C. is used. As this radical initiator, preferably used are such organic peroxides as di-tertiary-butylperoxide, ditertiary-amylperoxide, benzoyl peroxide, tertiary-butylperbenzoate, ditertiary-butylhydroperoxide and dicumylperoxide. Irradiation with electron beam is also effective. For instance, when curing the invention composition on the surface of a substrate, the polymerization and cure of the composition can be accomplished in an extremely short period of time by irradiation with electron beam of the order of 0.5 – 70 Mrad, thus forming a cured coating on the surface of the substrate.

Further, the properties of the resulting cured resin can be improved still further by incorporating in the resinous composition of the invention, as required, such additives as fillers, mold releasing agents, polymerization accelerators, polymerization retarders, stabilizers, pigments and silane coupling agents to an extent that does not impair the effects of the invention composition.

As the foregoing fillers, included are the inorganic fillers such, for example, as mica, asbestos, powdered glass, silica, clay, titanium dioxide, magnesium oxide, alumina, asbestos fibers, silica fibers, glass fibers, silicate glass fibers, alumina fibers, carbon fibers, boron fibers, baryllium fibers, steel fibers and whiskers; and the organic fillers such as polyethylene, polypropylene, polyvinyl chloride, polyvinyl fluoride, polymethyl methacrylate, aliphatic and aromatic polyamides, polyimides, polyesterimides, polyamideimides, pulp, acrylic fibers, polyester fibers, such as polyethylene terephthalate, cotton and rayon. The amounts in which these fillers are used can be varied over broad limits, but preferred is an amount ranging from 20 to 500% by weight based on the total of the prepolymer (A) and monomer (B) and, as the case may be, the copolymerizable other monomer and/or polymer (C).

As the properties of the filler have an effect on the properties of the cured product, the class and amount of the filler used are chosen in accordance with the properties desired in the intended cured product. For instance, when the requirement is that the cured product be especially resistant to heat, an inorganic filler or an organic filler excelling in thermal resistance (e.g. polyvinyl fluorine, polybutadiene, an aromatic polyamide, polyimide, polyamideimide and polyesterimide) is chosen. When using these fillers, their mixing with the prepolymer can be accomplished readily and uniformly by a procedure consisting of, say, dissolving the foregoing prepolymer in an organic solvent.

As the solvent for use in this case, included are such, for example, as the aromatic hydrocarbons as benzene and toluene, the ketones as acetone and methyl ethyl ketone and the lower carboxylic acid esters as ethyl acetate. These solvents can also be used as a mixture.

As the mold releasing agents, there can be named such, for example, as stearic acid, lauric acid, and the metal salts of these acids, e.g., calcium stearate and zinc stearate. These mold releasing agents can be preferably used in an amount of 0.1 – 3% by weight based on the total of the aforesaid components (A) and (B) and, as the case may be, the component (C).

The aforementioned polymerization accelerator is effective in enhancing the molding speed or reducing the molding temperature. Preferably used as this polymerization accelerator are the organic cobalt compounds such, for example, as cobalt naphthanate and cobalt caprylate. These are preferably used in an amount of about 0.1% — about 3% by weight based on the total of the aforesaid components (A) and (B) and, as the case may be, the component (C).

On the other hand, the aforementioned polymerization retarder or stabilizer controls the molding speed and is effective in producing shaped articles with a uniform finish. For this purpose, usable are such, for example, as hydroquinone, n-propylgallate, p-benzoquinone, tetramethylthiuram disulfide and paramethoxyphenol. These are preferably used in an amount of about 0.001% — about 0.1% by weight based on the total of the aforesaid components (A) and (B) and, as the case may be, the component (C).

As the pigments, there are, for example, carbon black, ceramic black, phthalocyanin blue, phthalocyanin green, titan yellow and titan white, which pigments can be used in such amounts as are required to obtain the desired coloring. Further, as the silane coupling agent, mention can be made of the vinyl silanes (e.g. vinyl-tri (beta-methylethoxy(silane), the aminosilanes (e.g. gamma-aminopropyltriethoxysilane), and the epoxidized silanes (e.g. glycidoxypropyltrimethoxysilane). The use of these in an amount of about 0.1% - about 5% by weight based on the total of the aforesaid components (A) and (B) and, as the case may be, the component (C) will suffice.

The radical initiator-curable diallyl ester composition of this invention can also be cured by exposure to light, radiation or electron beam.

As specific curing and molding methods, the following can be mentioned; for example:

1. The compression molding method wherein the starting material is placed in a mold and then cured by heating under pressure;

2. The injection molding or transfer molding method wherein the starting material is imparted fluidity by heating and then introduced into a mold where the polymerization and cure is carried out;

3. The laminate molding method wherein the starting material is dissolved in an organic solvent, after which the resulting solution is impregnated into a fibrous sheet such as a glass mat, nonwoven fabric, etc., followed by removing the solvent by drying and thereafter polymerizing and curing the starting material inside the fibrous sheet;

4. The coating method which comprises coating a substrate with either a solvent solution of the starting material or the starting material in finely divided form and then polymerizing and curing the starting material thereon; and 5. The decorative laminate molding method wherein, say, a printed paper is impregnated with a solution of the starting material and, after driving off the solvent by precuring, it is heat-pressed onto a substrate thereby effecting its polymerization and cure.

As fully described hereinabove, the invention resinous composition excels in its pulverizability and storage stability before its molding, as well as excels in its flow, stability of its flow in the molding machine and dimensional stability at the time of its molding, and furthermore excels in its thermal resistance, resistance to chemicals and electrical properties after its molding.

The following examples are given for more fully illustrating the present invention. In the examples the parts are in all cases on a weight basis. The flexural property was measured in accordance with ASTM Method D-790, the heat deflection temperature under load was measured in accordance with ASTM Method D-648, the volume and surface resistivities were measured in accordance with ASTM Method D-257, the dielectric constant and discipation facter were determined in accordance with ASTM Method D-150 (1 KHZ), and the arc resistance was measured in accordance with ASTM Method D-495 (W electrode).

EXAMPLES 1 – 3 and Controls 1 – 3

One hundred parts by weight of a prepolymer of diallyl orthophthalate (number average molecular weight 9000, iodine value 64) was admixed with 2,6-naphthalenedicarboxylic acid diallyl ester (crystalline powder of m.p. 84°C., hereinafter abbreviated to 2,6-DAN) or, as control, diallyl orthophthalate in an amount indicated in Table 1, after which the resulting mixture was dissolved in an equivalent of acetone. To this solution were then added chopped glass strands (FECS 0405 produced by Fuji Glass Fiber Co., Japan) of 6 mm length in an amount equivalent to the total resinous components consisting of the prepolymer and monomer, 2/100 amount of the total resin of tert.butyl-peroxide and 2/100 amount of the total resin of calcium stearate followed by thorough mixing in a kneader. This was followed by air drying the mixture and then kneading it for 5 minutes with hot rollers held at 100°C., after which the mass was comminuted to obtain a molding material.

For determining the flow and storage stability of the so obtained molding material, the amount of plunger descent immediately after the preparation of the molding material and after the passage of a one-year period at 25°C. and 65% relative humidity were measured. These measurements were conducted with a Koka type flow tester, the measurements being made by reading the amount of plunger descent after passage of one minute under the conditions of a nozzle having a diameter of 1.0 mm and a length of 1.0 mm, a cylinder diameter of 10 mm, a temperature of 100°C., a pressure of 50 kg/cm$^2$ and a preheating time of 1 minute. The ratio of the amount of plunger descent after the passage of one year to that immediately after the preparation of the molding material was used as the criterion of the storage stability. For testing the stability of the molding material in the molding machine, the molding was carried out after causing the molding material to dwell for 30 minutes in the cylinder during its molding in an injection molding machine (Model N-100 manufactured by Nippon Seikojo K. K., cylinder 90°C., mold 160°C.). On the other hand, the molding shrinkage was determined by carrying out the compression molding of the molding material, using a disk mold 100 mm in diameter. The conditions in this case was as follows: preheating for 5 minutes with a 250-watt infrared lamp, a mold temperature of 170°C., a pressure of 50 kg/cm$^2$ and a curing time of 6 minutes. For testing the curability of the molding material, the "Curelastometer" Model II manufactured by Japan Synthetic Rubber Company was used under the conditions of a mold temperature of 170°C., an amplitude of ± 0.5° and an oscillatory speed of 6 cycle per minute, the time until 90% cure being measured. On the other hand, for determining the thermal resistance of the resulting cured resin, the cured resin was heat treated for 2 hours in a hot air circulating type constant temperature chamber whose temperature was set at 260°C. The weight and flexural strength of the resin before and after the treatment were measured and the rates of decline in weight and flexural strength were obtained. The results are shown in Table 1.

Table 1

| Experiment No. | Example 1 | Example 2 | Example 3 | Control 1 | Control 2 | Control 3 |
| --- | --- | --- | --- | --- | --- | --- |
| Composition of resin (wt pts) | | | | | | |
| Prepolymer (A) | 100 | 100 | 100 | 100 | 100 | 100 |
| 2,6-DAN (B) | 5 | 10 | 20 | 120 | — | — |

Table 1-continued

| Experiment No. | Example 1 | Example 2 | Example 3 | Control 1 | Control 2 | Control 3 |
| --- | --- | --- | --- | --- | --- | --- |
| DAP (C) | — | — | — | — | 5 | 10 |
| Properties of molding material | | | | | | |
| Pulverizability | Excellent | Excellent | Excellent | Good | Good | Poor |
| Amount of plunger descent (mm/min) | | | | | | |
| Immediately after preparation | 7.2 | 10.5 | 12.5 | >40 | 1.0 | 4.0 |
| After passage of one year | 5.9 | 9.5 | 10.8 | >40 | 0.6 | 2.5 |
| Retention (%) | 82* | 91 | 86 | — | 60 | 63 |
| Curability (Curelastometer) (min) | 2.3 | 2.7 | 3.3 | >10*[1] | 2.2 | 2.6 |
| Moldability after 30-minute dwell in cylinder | Good | Good | Good | Good | Poor*[2] | Poor*[2] |
| Molding shrinkage (%) | 0.4 | 0.3 | 0.3 | *[3] | 0.7 | 0.9 |
| Properties of cured resin | | | | | | |
| Heat deflection temperature (°C) | 180 | 205 | 210 | — | 150 | 145 |
| Flexural strength (kg/mm$^2$) | 7.6 | 8.4 | 8.5 | — | 7.2 | 6.7 |
| Thermal resistance on heat treatment for 2 hours at 260°C. | | | | | | |
| Weight reduction (%) | 5 | 3 | 2 | — | 12 | 14 |
| Flexural strength (kg/mm$^2$) | 4.6 | 6.4 | 6.8 | — | 2.0 | 1.7 |
| Flexural strength retention (%) | 61 | 76 | 80 | — | 28 | 25 |
| Electrical properties | | | | | | |
| Dielectric constant (1 KHz) | | | | | | |
| Untreated | 3.7 | 3.5 | 3.5 | — | 3.9 | 4.2 |
| Boiling treatment*[4] | 3.8 | 3.6 | 3.6 | — | 4.1 | 4.5 |
| Dielectric tangent (1 KHz) × 10$^4$ | | | | | | |
| Untreated | 60 | 42 | 51 | — | 90 | 95 |
| Boiling treatment*[4] | 90 | 61 | 75 | — | 120 | 158 |
| Volume resistivity (Ω-cm) | | | | | | |
| Untreated | $5 \times 10^{15}$ | $6 \times 10^{16}$ | $7 \times 10^{16}$ | — | $3 \times 10^{14}$ | $6 \times 10^{14}$ |
| Boiling treatment*[4] | $4 \times 10^{15}$ | $8 \times 10^{15}$ | $3 \times 10^{15}$ | — | $5 \times 10^{13}$ | $5 \times 10^{13}$ |
| Surface resistivity (Ω) | | | | | | |
| Untreated | $2 \times 10^{16}$ | $8 \times 10^{16}$ | $4 \times 10^{16}$ | — | $8 \times 10^{15}$ | $2 \times 10^{15}$ |
| Boiling treatment*[4] | $8 \times 10^{15}$ | $2 \times 10^{16}$ | $9 \times 10^{15}$ | — | $4 \times 10^{13}$ | $3 \times 10^{13}$ |

*[1] The cure was slow, and moreover the flow was so great that the composition flowed out of the mold.
*[2] Hardening took place in the cylinder, and the flow of the composition was stopped.
*[3] The flow was too great, with the consequence that the mold-ability, rather than being improved, became poor. Further, the cured product broke when being removed from the mold.
*[4] Boiled in water for 2 hours.
Abbreviations:
DAP stands for diallyl orthophthalate.
DAN stands for diallyl naphthalate.

EXAMPLE 4

To a mixture of 90 parts of diallyl isophthalate and 10 parts of diallyl (hexachloroendomethylenetetrahydrophthalate) was added 0.1 part of benzoyl peroxide, after which the mixture was polymerized for 2.5 hours at 100° – 120°C. The polymerization mixture was then poured into a 20-fold amount of methanol and precipitated to obtain as a white precipitate a precopolymer (DAIP-DAHET) of the foregoing diallyl isophthalate and diallyl(hexachloroendomethylenetetrahydrophthalate).

After mixing 20 parts of 2,6-DAN with 100 parts of the so obtained coprepolymer (number average molecular weight 7800, iodine value 69, chlorine content 3.3 weight %), the experiment was carried out as in Example 1 in mixing and kneading with this mixture 60 parts of calcium carbonate (SL-300 produced by Takehara Chemical Company, Japan), 120 parts of chopped strands (fiber length 6 mm produced by Fuji Fiber Glass Company), 2 parts of tert.-butylperbenzoate and 2 parts of calcium stearate followed by comminution of the resulting mass to obtain a molding material.

The properties of the so obtained molding material and the cured resin obtained therefrom are shown in Table 2.

EXAMPLE 5

One hundred parts of a prepolymer of diallyl orthophthalate (the same prepolymer as that of Example 1), 5 parts of a prepolymer of 2,6-DAN and 15 parts of 2,6-DAN were mixed and, then by operating as in Example 4, 60 parts of calcium carbonate, 120 parts of glass fibers, 2 parts of tert.butylperbenzoate and 2 parts of zinc stearate were mixed and kneaded with the foregoing mixture followed by comminuting the resulting mass to obtain a molding material.

The properties of the so obtained molding material and the cured resin obtained therefrom are shown in Table 2.

EXAMPLE 6

Twenty parts of 2,6-DAN and 5 parts of diallyl isophthalate were mixed with 100 parts of a prepolymer of diallyl (hexahydroterephthalate) (cis form content 15%). This was followed by operating exactly as in Example 4 in mixing and kneading therewith 60 parts of calcium carbonate, 120 parts of glass fibers, 2 parts of tert.-butylperbenzoate and 2 parts of carnauba wax and thereafter comminuting the resulting mass to obtain a molding material. The properties of the so obtained molding material and the cured resin obtained therefrom are shown in Table 2.

EXAMPLE 7

To a prepolymer of diallyl isophthalate (number average molecular weight 12,800, iodine value 72) were admixed 10 parts of 1,5-DAN and 10 parts of 2,6-DAN, following which the experiment was carried out exactly as in Example 4 in mixing and kneading therewith 60 parts of calcium carbonate, 120 parts of glass fibers, 2 parts of calcium stearate and 2 parts of dicumylperoxide and thereafter comminuting the resulting mass to obtain a molding material. The properties of the so obtained molding material and the cured resin obtained therefrom are shown in Table 2.

Table 2

| Experiment No. | Example 4 | | Example 5 | | Example 6 | | Example 7 | |
|---|---|---|---|---|---|---|---|---|
| Composition of resin (wt pts) | | | | | | | | |
| Prepolymer (A) | DAIP-DAHET prepolymer | (95-5) 100 | DAP prepolymer | 100 | DAHET prepolymer | 100 | DAIP prepolymer | 100 |
| DAN (B) | 2,6-DAN | 20 | 2,6-DAN | 15 | 2,6-DAN | 20 | 1,5-DAN | 10 |
| | | | | | | | 2,6-DAN | 10 |
| Other copolymerizable unsaturated compounds (C) | — | | 2,6-DAN prepolymer | 5 | DAIP | 5 | — | |
| Properties of molding material | | | | | | | | |
| Pulverizability | Excellent | | Excellent | | Good | | Excellent | |
| Amount of Plunger descent (mm/min) | | | | | | | | |
| Immediately after preparation | 10.9 | | 9.2 | | 16.2 | | 11.1 | |
| After passage of one year | 9.0 | | 7.8 | | 12.5 | | 9.2 | |
| Amount of descent retention (%) | 83 | | 85 | | 77 | | 83 | |
| Curability (Curelastometer) (min) | 3.6 | | 3.1 | | 3.8 | | 4.0 | |
| Moldability after 30-minute dwell in cylinder | Good | | Good | | Good | | Good | |
| Molding shrinkage (%) | 0.3 | | 0.3 | | 0.4 | | 0.3 | |
| Properties of cured resin | | | | | | | | |
| Heat deflection temperature (°C) | >230 | | 212 | | >230 | | >230 | |
| Flexural strength (kg/mm$^2$) | 7.5 | | 8.0 | | 7.0 | | 8.6 | |
| Thermal resistance on heat treatment for 2 hours at 260°C. | | | | | | | | |
| Weight reduction (%) | 3 | | 2 | | 2 | | 4 | |
| Flexural strength (kg/mm$^2$) | 6.1 | | 6.6 | | 5.7 | | 6.7 | |
| Flexural strength retention (%) | 81 | | 83 | | 81 | | 78 | |
| Electrical properties | | | | | | | | |
| Dielectric constant (1 KHz) | 3.7 | | 3.5 | | 3.6 | | 3.8 | |
| Dielectric tangent (1 KHz × 10$^4$); 58 | | 46 | | 55 | | 60 | | |
| Volume resistivity (Ω-cm) 5 × 10$^{16}$ | | 6 × 10$^{16}$ | | 6 × 10$^{16}$ | | 8 × 10$^{16}$ | | |
| Surface resistivity (Ω) | 2 × 10$^{16}$ | | 8 × 10$^{16}$ | | 6 × 10$^{16}$ | | 2 × 10$^{16}$ | |

Abbreviations:
DAP stands for diallyl orthophthalate.
DAIP stands for diallyl isophthalate.
DAHET stands for diallyl (hexachloroendomethylenetetrahydrophthalate).
DAN stands for 2,6- or 1,5-diallyl naphthalate.
DAHT stands for diallyl(hexahydroterephthalate).

We claim:
1. A radical initiator-curable diallyl ester composition consisting essentially of 80 – 100% by weight of the following components (A) and (B):
   A. a prepolymer wherein
   1. 70 – 100 mole % of its structural units are derived from a diallyl ester selected from the group consisting of
   a. a diallyl ester of benzenedicarboxylic acid having the formula (I)

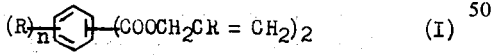   (I)

wherein the R's, which may be the same or different, are independently selected from the group consisting of hydrogen and methyl, and $n$ is an integer from 1 to 2,
   b. a diallyl ester of cyclohexanedicarboxylic acid having the formula (II)

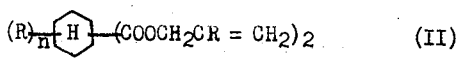   (II)

wherein the R's and $n$ are as above defined, and
   c. a mixture of the above (a) and (b); and
   2. 30 – 0 mole % of its structural units are derived from other compounds selected from monomeric diallyl esters of dibasic acids and other monomers and polymers, said compound being copolymerizable with said (a) – (c) under the conditions of forming said prepolymer; and
   B. a monomer of a diallyl ester of naphthalenedicarboxylic acid having the formula (III)

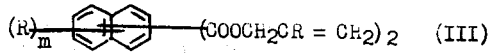   (III)

wherein the R's are as above defined, and $m$ is an integer from 1 to 4, which groups —COOCH$_2$CR=CH$_2$ are attached in a position selected from the 2,7-, 1,5- and 2,6-positions;
   said monomer (B) being contained in an amount of 5 – 50% by weight based on said prepolymer (A), and the remaining 20 – 0% by weight of said composition being a compound (C) other than said (A) and (B), said (C) being selected from the group consisting of monomers and polymers copolymerizable with a member selected from the group consisting of said prepolymer (A) and said monomer (B) at the conditions under which said composition is cured.
2. A composition of claim 1 wherein said prepolymer (A) has a number average molecular weight of about 1000 to about 50,000.
3. A composition of claim 1 wherein said monomer (B) is contained in an amount of about 5 – 20% by weight based on said prepolymer (A).

* * * * *